United States Patent
Justusson et al.

(10) Patent No.: US 11,846,055 B2
(45) Date of Patent: Dec. 19, 2023

(54) MANUFACTURING PROCESSES FOR IMPROVED MECHANICAL PERFORMANCE OF STITCHED COMPOSITES

(71) Applicant: The Boeing Company, Chicago, IL (US)

(72) Inventors: Brian P. Justusson, Saint Peters, MO (US); Joseph D. Schaefer, Richmond Heights, MO (US)

(73) Assignee: The Boeing Company, Arlington, VA (US)

( * ) Notice: Subject to any disclaimer, the term of this patent is extended or adjusted under 35 U.S.C. 154(b) by 309 days.

(21) Appl. No.: 17/399,815

(22) Filed: Aug. 11, 2021

(65) Prior Publication Data

US 2023/0049264 A1 Feb. 16, 2023

(51) Int. Cl.
*D05B 19/12* (2006.01)
*G01B 21/08* (2006.01)
*G05B 15/02* (2006.01)

(52) U.S. Cl.
CPC .............. *D05B 19/12* (2013.01); *G01B 21/08* (2013.01); *G05B 15/02* (2013.01)

(58) Field of Classification Search
CPC ........ D05B 19/12; D05B 47/04; D05B 19/08; G01B 21/08
See application file for complete search history.

(56) References Cited

U.S. PATENT DOCUMENTS

| 5,461,997 | A | * | 10/1995 | Landen | D05B 29/02 112/237 |
| 5,915,317 | A | * | 6/1999 | Thrash | D05B 23/00 112/155 |
| 5,931,107 | A | * | 8/1999 | Thrash | D05B 23/00 112/281 |
| 6,198,983 | B1 | * | 3/2001 | Thrash | D05B 19/08 700/181 |
| 8,246,882 | B2 | | 8/2012 | Tsotsis | |
| 2012/0073484 | A1 | * | 3/2012 | Nakamura | D05B 47/04 112/154 |

* cited by examiner

*Primary Examiner* — Nathan E Durham
(74) *Attorney, Agent, or Firm* — McDonnell Boehnen Hulbert & Berghoff LLP

(57) ABSTRACT

An example method includes determining, by a computing system, a dry thickness of a fabric preform. The method also includes determining, by the computing system, a debulked thickness of the fabric preform using the dry thickness of the fabric preform. In addition, the method includes determining, by the computing system, a stitch tension using the dry thickness of the fabric preform and the debulked thickness of the fabric preform. And the method includes causing, by the computing system, a stitching machine to apply a through-the-thickness stitch having the stitch tension to the fabric preform.

20 Claims, 11 Drawing Sheets

STITCH UNDER NET-ZERO TENSION:
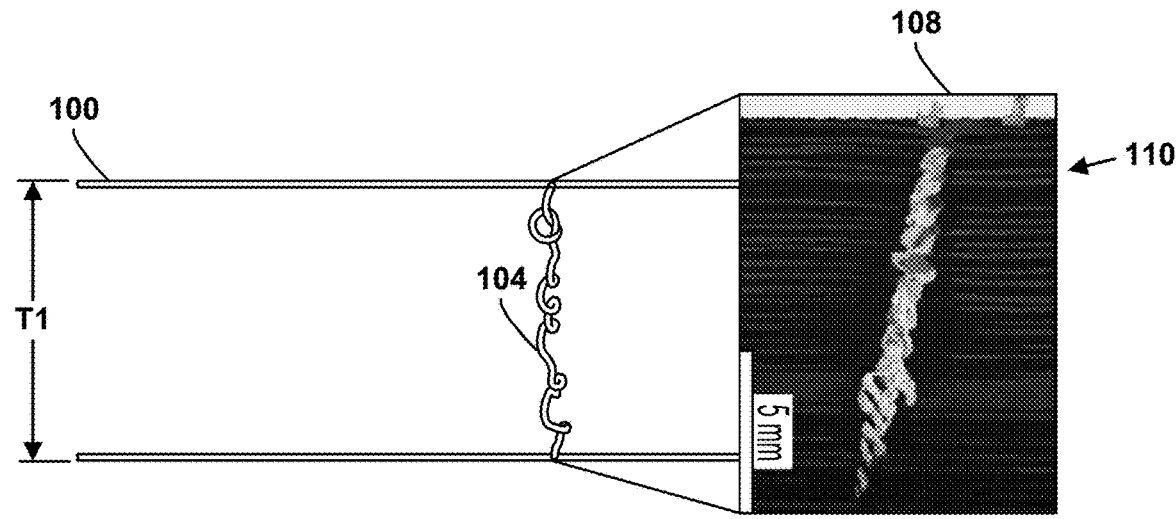
STITCH UNDER THICKNESS-DEPENDNET TENSION:
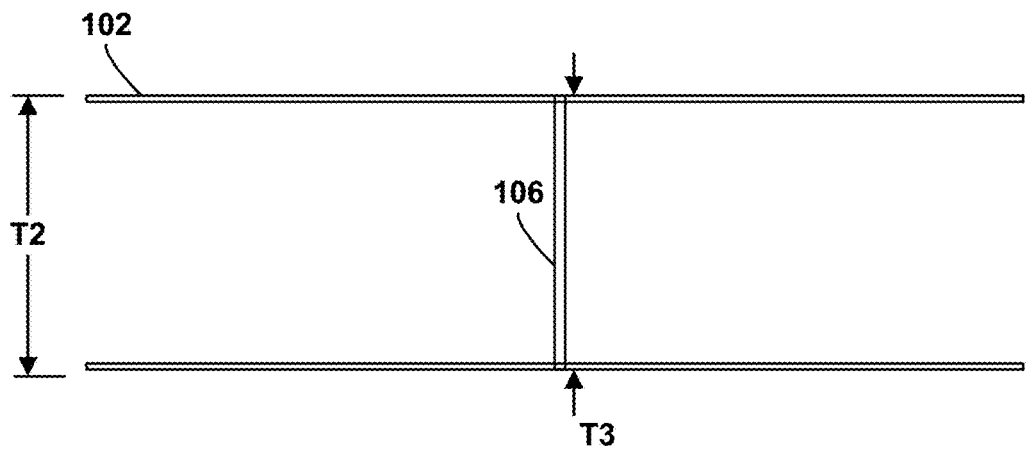
FIG. 1

MANUFACTURING PROCESSES FOR IMPROVED MECHANICAL PERFORMANCE OF STITCHED COMPOSITES

FIELD

The present disclosure relates generally to manufacturing composite structures, and more particularly, to stitching machines and processes for stitching fabric preforms.

BACKGROUND

Composite materials are increasingly used as substitutes for conventional materials, such as aluminum and steel alloys, in various structural components due to the generally high strength-to-weight ratio inherent in composite materials. For instance, composite parts are presently used as parts for aircrafts, land vehicles, water vehicles, and wind turbines. Composite materials generally include a base material and one or more reinforcement materials. Common composite structural construction contains structural building blocks known as lamina/plies in which a lamina consists of the base and reinforcement phase as a single, repeatable unit. When integrated into a structure as a pre-impregnated lamina or infused with external media, interfaces between reinforcement phases are developed. Composite materials of this nature include ceramic matrix composites, short fiber composites, glass fiber composites, carbon fiber composites, and other similar composites.

Designs for some aircraft wings employ composite structural components in the aircraft wing. By way of example, a composite aircraft wing can include spars that run along a length of the composite aircraft wing and ribs that run along a width of the composite aircraft wing. The composite aircraft wing can also include a skin that covers much of the composite aircraft wing, and stringers that support sections of the composite aircraft wing. Components of the composite aircraft wing can be held together using fasteners. For instance, spars can be fastened to ribs and stringers.

Composite structures are susceptible to translaminar failure modes (e.g., delamination/disbond) in which there is a rapid deterioration of load carrying capability due to an architectural feature separating from the structure. Due to certification requirements for aircrafts, the overall structure of some aircraft parts must retain residual strength for a full disbond of an architectural feature. To meet this requirement, bondlines of aircraft parts are reinforced with fasteners. For instance, fasteners are commonly used along stringer flanges of composite spars. These fasteners add weight to the aircraft, increase part counts, increase touch work, and add uncertainty to the build process—requiring extensive inspection during and after manufacturing. Additionally, fastened structures can require a high frequency of maintenance cycles due to damage that can occur in the fasteners or in areas surrounding the fasteners. Additionally, in some applications, aircraft structures are required to resist pressure load, which is a through-thickness loading. For instance, in fuselage applications, aircraft structures are required to resist pressure loading.

SUMMARY

In one example, a method is described. The method includes determining, by a computing system, a dry thickness of a fabric preform. The method also includes determining, by the computing system, a debulked thickness of the fabric preform using the dry thickness of the fabric preform. In addition, the method includes determining, by the computing system, a stitch tension using the dry thickness of the fabric preform and the debulked thickness of the fabric preform. And the method includes causing, by the computing system, a stitching machine to apply a through-the-thickness stitch having the stitch tension to the fabric preform.

In another example, a stitch machine is described. The stitching machine includes a stitching unit and an adjustable thread tensioner. The adjustable thread tensioner is configured to apply a predefined stitch tension to a thread. The adjustable thread tensioner includes a tension rod extending from a side of the stitching unit and configured to apply the predefined stitch tension to the thread. The tension rod includes a thread support configured to contact the thread. The adjustable thread tensioner also includes a tension adjuster configured to adjust the predefined stitch tension by adjusting a position of the tension rod relative to the stitching unit.

In another example, a computing system including a processor and a non-transitory computer-readable medium is described. The non-transitory computer-readable medium has stored therein instructions that are executable to cause the computing system to perform functions. The functions include determining a dry thickness of a fabric preform, determining a debulked thickness of the fabric preform using the dry thickness of the fabric preform, determining a stitch tension using the dry thickness of the fabric preform and the debulked thickness of the fabric preform, and causing a stitching machine to apply a through-the-thickness stitch having the stitch tension to the fabric preform.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

FIG. 1 is a conceptual illustration of the effects of debulking on through-thickness stitching.

DETAILED DESCRIPTION

Figure 2:
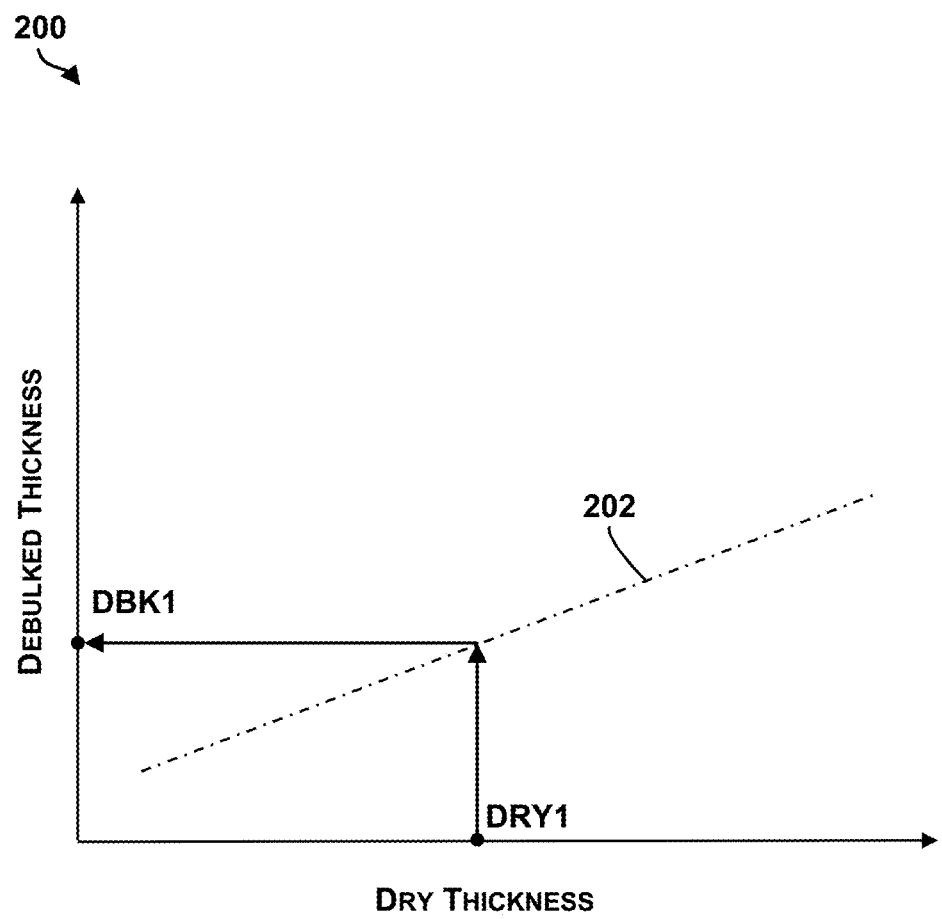
FIG. 2 is a conceptual illustration of mapping a dry thickness of a fabric preform to a debulked thickness, according to an example.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

As noted above, current strategies for ensuring bondline integrity in composite structures are costly and can also limit structural design. Through-thickness stitching can provide interlaminar/bondline reinforcement to composite structures with minimal damage to the composite structure and limited reduction in strength, stiffness, and material quality. For example, dry fabric preforms can be stitched with a high toughness thread and infused with resin, yielding stitched resin infused (S/RI) structures.

When compared to fastener-reinforced composite structures, S/RI structures improve bondline performance, allow for higher degrees of unitization, and reduce part counts and weights of composite structures. For example, S/RI structures provide improved crack resistance by requiring a larger load to progress a crack relative to unstitched composite structures. In addition, S/RI structures allow for higher loads to be carried in a composite structure prior to failure relative to unstitched composite structures.

However, conventional approaches to stitching S/RI structures include several problems. By way of example, S/RI structures manufactured using conventional approaches provide minimal resistance to Mode II disbonds. In the context of a composite structure, a Mode II disbond refers to the in-plane shearing between layers of the composite structure resulting in adjacent layers sliding past one another and failing to maintain geometric conformity to design requirements. For instance, an upper layer can slide in a first direction that is parallel to a plane of a crack and a lower layer slides in a second direction that is opposite to the first direction and also parallel to the plane of the crack.

With conventional approaches to stitching S/RI structures, dry fabric preforms are through-thickness stitched under net-zero tension. Net-zero tension is the tension required to pull a thread through a fabric preform. When stitching under net-zero tension, after the thread is pulled through a fabric preform and the thread is cut from a stitching machine, only nominal tension remains in the thread. After through-thickness stitching the dry fabric preform, the preform is debulked (thickness reduced) and infused with resin. Due to the debulking, the through-thickness stitching can sometimes coil on top of itself. Such coiling of through-thickness stitching limits the ability of the through-thickness stitching to provide resistance to Mode II disbonds. Due to the coiling, layers of the composite structure are able to shear by a finite amount before the stitching engages and provides any resistance to the shearing.

As another example, with conventional approaches, stitching consecutive rows of stitching can cause the fabric preform to shear and adversely affect the orientation of stitches. For instance, an operator may desire to stitch multiple through-thickness stitches in a row, with each stitch oriented perpendicular to an axis of a fabric preform. A first stitch may be inserted at a proper angle (i.e., ninety degrees). However, when a second stitch is applied, a needle of a stitching machine may deform the fabric preform that is held with the previous stitch and, by doing so, pull the fabric preform closer to the needle. This can cause the second stitch to be inserted at an improper angle (e.g., eighty degrees rather than ninety degrees). An orientation of a stitch has an effect on the load carrying capability of an S/RI structure. Therefore, applying a stitch at an improper orientation can reduce the load carrying capability of an S/RI structure.

Disclosed herein are methods and systems to address this and potentially other issues. In an example method, a computing system can determine a dry thickness of a fabric preform, and determine a debulked thickness of the fabric preform using the dry thickness of the fabric preform. The computing system can then determine a stitch tension using the dry thickness of the fabric preform and the debulked thickness of the fabric preform. After determining the stitch tension, the computing system can cause the stitching machine to apply a through-the-thickness stitch having the stitch tension to the fabric preform. Advantageously, by stitching the stitch with an appropriate stitch tension, the thickness of the stitch region after debulking the fabric preform can be approximately equal to the debulked thickness of the fabric preform. As such, the stitch can provide improved resistance to Mode II disbonds as compared to resistance provided by stitches that are stitched under net-zero tension.

In some examples, a fabric preform can be edge-stitched within a scrap region of the fabric preform prior to causing the stitching machine to apply the stitch having the stitch tension. For instance, edge-stitching can be provided around a perimeter of the fabric preform. This edge-stitching can prevent layers of the fabric preform from shearing during stitching, thereby helping to ensure that stitches are provided at consistent and intended orientations. Optionally, the edge-stitching can be provided using the stitch tension that is determined using the example method.

Further, in some examples, a pressure applied to the fabric preform by an adapter plate of the stitching machine can be adjusted prior to causing the stitching machine to stitch the fabric preform using the stitch tension. The adapter plate can apply downward pressure to a top, stitching-machine facing side of the fabric preform, thereby clamping the fabric preform between the adapter plate and a support structure. This clamping pressure can help prevent layers of the fabric preform from shearing during stitching. Further, the adapter plate can be integrated with a needle casing of the stitching machine, such that pressure is only applied when a needle of the stitching machine is being sunk into the fabric preform.

An example stitching machine includes a stitching unit and an adjustable thread tensioner. The adjustable thread tensioner is configured to apply a stitch tension to a thread and includes a tension rod and a tension adjuster. The tension rod extends from a side of the stitching unit and is configured to apply the stitch tension to the thread by way of a thread support that contacts the thread. The tension adjuster is configured to adjust the stitch tension by adjusting a position of the tension rod relative to the stitching unit. Advantageously, an operator or a computing system can use the adjustable thread tensioner to cause the stitching machine to stitch a fabric preform with a desired stitch tension, such as a stitch tension that provides improved resistance to Mode II disbonds.

Various other features of these systems and methods are described hereinafter with reference to the accompanying figures.

Referring now to FIG. 1, FIG. 1 is a conceptual illustration of the effects of debulking on through-thickness stitching. In the manufacturing of composite structures, debulking refers to the process of applying vacuum pressure to a structure preform in order to reduce a thickness of the structure preform. A fabric preform can be debulked after sealing the fabric preform and prior to performing resin infusion.

The conceptual illustration of FIG. 1 depicts a cross-section of a first fabric preform 100 after debulking and a cross-section of a second fabric preform 102 after debulking. First fabric preform 100 and second fabric preform 102 can be any of a variety of types of fabric preforms. One example of a fabric preform is a woven preform in which fibers are oriented at orthogonal orientations to one another. Another example of a fabric preform is a braided preform in which layers are braided together in plane. 3D woven preforms and non-crimp fabric preforms are other examples.

As further shown in FIG. 1, first fabric preform 100 includes a first through-the-thickness stitch 104. Similarly, second fabric preform 102 includes a second through-the-thickness stitch 106. Further, first fabric preform 100 has a debulked thickness T1 and second fabric preform 102 has a debulked thickness T2.

Prior to debulking, first through-the-thickness stitch 104 was applied to first fabric preform 100 under net-zero tension. As noted above, net-zero tension is the tension required to pull a thread through a fabric preform. When stitching under net-zero tension, after the thread is pulled through a fabric preform and the thread is cut from a stitching machine, only nominal tension remains in the thread. Prior to debulking, first through-the-thickness stitch 104 may be substantially linear (not shown). However, due to the debulking, first through-the-thickness stitch 104 is no longer substantially linear. Instead, as shown in image 108, first through-the-thickness stitch 104 has coiled on top of itself, such that sections of first through-the-thickness stitch 104 are curvy and non-linear.

In line with the discussion above, due to the coiling and relaxation of first through-the-thickness stitch 104 after debulking, first through-the-thickness stitch 104 provides minimal resistance to Mode II disbonds. Layers 110 of first fabric preform 100 are able to shear with respect to one another by a finite amount before first through-the-thickness stitch 104 engages and provides any resistance to the shearing. For instance, since first through-the-thickness stitch 104 includes coils, a first layer of first fabric preform is able to shear (i.e., move left, right, into the page, or out of the page in FIG. 1) with respect to a second, adjacent layer of first fabric preform 100 until a section of first through-the-thickness stitch 104 at the joint between the first layer and the second layer has straightened out.

In contrast, second through-the-thickness stitch 106 was applied to second fabric preform 102 under a stitch tension that provides increased resistance Mode II disbonds. In the example of FIG. 1, second through-the-thickness stitch 106 was stitched with an appropriate stitch tension such that a thickness T3 of a stitch region of second through-the-thickness stitch 106 is substantially equal to debulked thickness T2 and second through-the-thickness stitch 106 is substantially linear through thickness T3 of the stitch region after debulking.

Applying a stitch with a stitch tension that is too strong can result in resin pockets (e.g., divots in the material continuity) that provide preferential areas for cracking. In addition, applying a stitch with a stitch tension that is too strong can deform fibers within a fabric preform. Deforming fibers can, in turn, reduce an in-plane strength of the resulting composite structure. Therefore, it is desirable to apply a stitch with an appropriate stitch tension.

In line with the discussion above, a computing system can determine a stitch tension based on a dry thickness of a fabric preform. More specifically, using a dry thickness of a fabric preform, the computing system can determine a debulked thickness of the fabric preform. Further, the computing system can then determine a stitch tension using the dry thickness of the fabric preform and the debulked thickness of the fabric preform, and cause a stitching machine to apply a through-the-thickness stitch having the stitch tension to the fabric preform.

The fabric preform can be a fabric preform for a composite structure. Prior to the stitching and debulking, the fabric preform can have a dry thickness. For instance, the dry thickness can be a combined thickness of multiple, stacked layers of the fabric preform. A computing system can determine the dry thickness in various manners.

By way of example, a user can input the dry thickness by way of a user interface of the computing system, and the computing system can determine the dry thickness based on the user input. Alternatively, the computing system can determine the dry thickness based on measurement data received from a thickness sensor (e.g., a laser thickness sensor). As another example, the computing system can determine the dry thickness based on a map for a fabric preform that stores measurement data for the fabric preform at various locations (e.g., dry thicknesses at various combinations of x-coordinates and y-coordinates of a two-dimensional grid space). Hence, the stitching approach disclosed herein can be used with non-constant thickness parts such as a charge, pad-up, or flange.

Further, the debulked thickness of the fabric preform can be an expected thickness of the fabric preform after debulking the fabric preform. The debulked thickness of a fabric preform may be dependent on the dry thickness of the fabric preform as well as various other factors such as the applied vacuum pressure during debulking, the type of fabric preform, and the material of the fabric preform.

A computing system can determine a debulked thickness of a fabric preform using a dry thickness of the fabric preform. For instance, determining the debulked thickness can involve mapping the dry thickness of the fabric preform to the debulked thickness using correlation data that maps dry thicknesses to debulked thickness.

FIG. 2 is a conceptual illustration of mapping a dry thickness of a fabric preform to a debulked thickness, according to an example. As shown in FIG. 2, a plot 200 of debulked thickness versus dry fabric thickness can be determined analytically or experimentally. In one example, the slope of trend line 202 may be less than one. For instance, the slope of trend line may be 0.9.

Correlation data corresponding to the relationship shown in plot 200 can be stored for use in mapping a dry thickness of a fabric preform to a debulked thickness. For instance, the correlation data can take the form of a lookup table or a function that converts dry thickness to debulked thickness. Since the relationship between dry thickness and debulked thickness can vary based on the factors noted above, different instances of correlation data can be generated and stored for different configurations (e.g., different vacuum pressures, types of preforms, and/or materials). As conceptually shown in FIG. 2, a computing system can use the correlation data to determine that a dry thickness DRY1 corresponds to a debulked thickness DBK1. By way of example, the dry thickness may be 3 mm, and the debulked thickness may be 2.5 mm.

After determining a debulked thickness of a fabric preform to be stitched, a computing system can determine a stitch tension using the dry thickness of the fabric preform and the debulked thickness of the fabric preform. For instance, determining the stitch tension can involve determining a crimp induced deflection for the fabric preform using the dry thickness of the fabric preform and the debulked thickness of the fabric preform, and determining the stitch tension using the dry thickness of the fabric preform and the crimp induced deflection.

The crimp induced deflection is a percentage by which the thickness of the fabric preform is reduced due to stitching with a stitch tension and debulking. As such, the crimp induced deflection is a function of the stitch tension as well as the dry thickness of a fabric preform. A computing system can determine the crimp induced deflection by dividing the debulked thickness of a fabric preform by the dry thickness. For instance, the crimp induced deflection for a fabric preform having a dry thickness of 3 mm and a debulked thickness of 2 mm is 66.7%.

Figure 3:
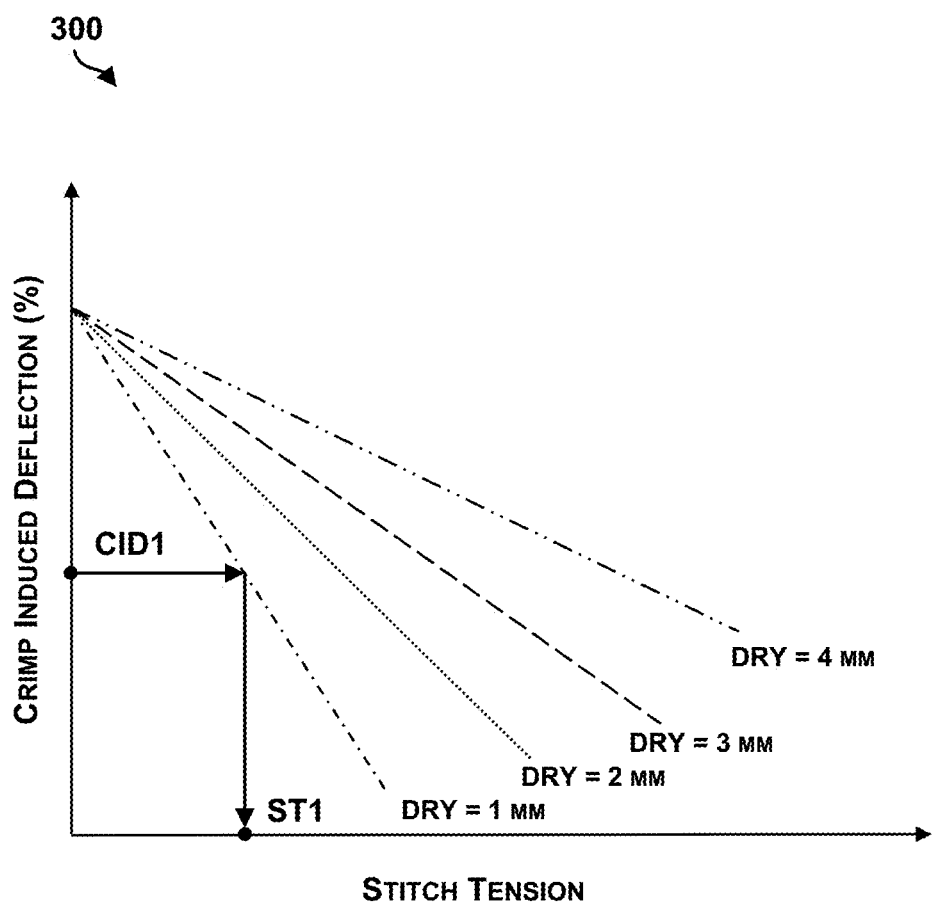
FIG. 3 is a conceptual illustration of mapping a dry thickness of a fabric preform and a crimp induced deflection to a stitch tension, according to an example.

FIG. 3 is a conceptual illustration of mapping a dry thickness of a fabric preform and a crimp induced deflection to a stitch tension, according to an example. As shown in FIG. 3, a plot 300 of crimp induced deflection versus stitch tension and dry thickness can be determined analytically or experimentally.

Correlation data corresponding to the relationships shown in plot 300 can be stored for use in mapping a dry thickness of a fabric preform and crimp induced deflection to a stitch tension. For instance, the correlation data can take the form of a lookup table or a function that converts dry thickness and crimp induced deflection to stitch tension. Different instances of correlation data can be generated and stored for different configurations (e.g., different vacuum pressures, types of preforms, and/or materials). As conceptually shown in FIG. 3, a computing system can use the correlation data to determine that a crimp induced deflection CID1 for a fabric preform having a dry thickness of 1 mm corresponds to a stitch tension ST1.

After determining the stitch tension, the computing system can cause a stitching machine to apply a stitch having the stitch tension to the fabric preform. By way of example, the computing system can transmit an instruction including the stitch tension to the stitching machine. Reception of the instruction can cause the stitching machine to set the stitch tension to stitch tension specified in the instruction. Alternatively, the computing system can display the stitch tension on a display, and an operator can then adjust the stitch tension of a stitching machine accordingly. As another example, the computing system can add the stitch tension to a map for the fabric preform that stores stitch tensions for various sections of the fabric preform. A stitching machine can refer to the map to determine an appropriate stitch tension for a section of the fabric preform that the stitching machine is currently stitching.

Figure 4:
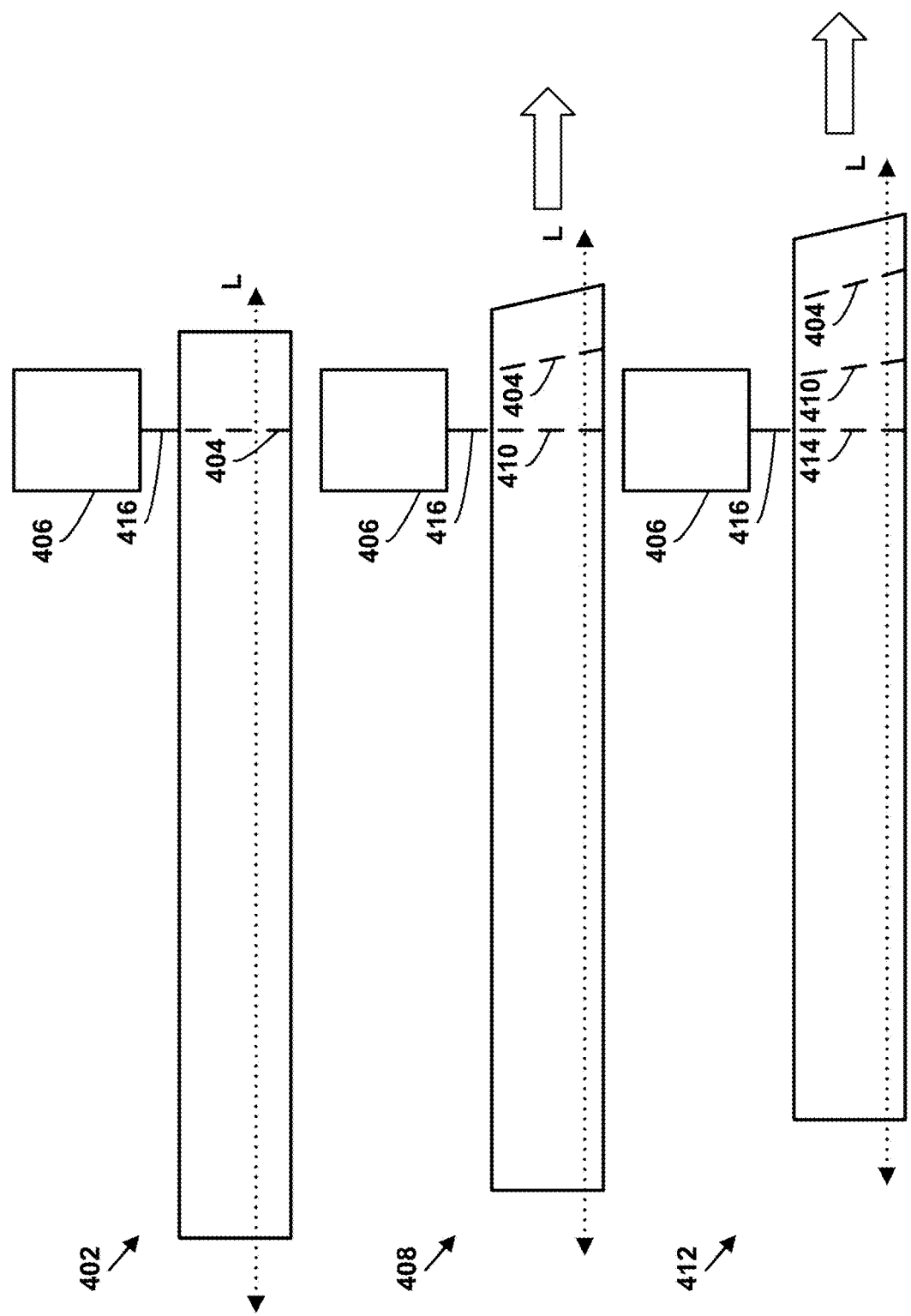
FIG. 4 is a conceptual illustration of shearing of a fabric preform during stitching.

FIG. 4 is a conceptual illustration of shearing of a fabric preform 400 during stitching. The conceptual illustration of FIG. 4 depicts three through-the-thickness cross-sections of fabric preform 400 during various stages of stitching. In particular, FIG. 4 shows a first through-the-thickness cross-section 402 of fabric preform 400 after a first stitch 404 is applied by a stitching machine 406, a second through-the-thickness cross-section 408 of fabric preform 400 after a second stitch 410 is applied by stitching machine 406, and a third through-the-thickness cross-section 412 of fabric preform 400 after a third stitch 414 is applied by stitching machine 406. Each of first stitch 404, second stitch 410, and third stitch 414 are through-the-thickness stitches intended to be applied perpendicular to a longitudinal axis L of the fabric preform.

As shown in first through-the-thickness cross-section 402, when first stitch 404 is applied using stitching machine 406, first stitch 404 is correctly applied and is substantially perpendicular to longitudinal axis L. However, as shown in second through-the-thickness cross-section 408, when second stitch 410 is subsequently applied, a needle 416 of stitching machine 406 deforms fabric preform 400 that is held by first stitch 404 and pulls fabric preform 400 closer to an insertion point at which needle 416 is inserted each time the needle is inserted. As a result, fabric preform 400 shears, causing second stitch 410 to be applied at an angle that is not perpendicular to longitudinal axis L. As shown in third through-the-thickness cross-section 412, as third stitch 414 is applied, fabric preform 400 continues to shear, such that third stitch 414 is also applied at an angle that is not perpendicular to longitudinal axis L.

Although FIG. 4 depicts stitching machine 406 as being stationary and fabric preform 400 being slid to the right to insert subsequent stitches, the example is not meant to be limiting. In other examples, fabric preform 400 can be held stationary while the position of stitching machine 406 is moved to insert stitches at different locations. In either scenario, shearing of fabric preform 400 can occur.

Similarly, a fabric preform can shear due to handling of the fabric preform by an operator between applications of consecutive stitches. Since an orientation of a stitch has an effect on the load carrying capability of an S/RI structure, stitching a stitch at an improper orientation can reduce the mechanical performance of the stitch relative to a stitch that is stitched at the intended orientation.

In line with the discussion above, prior to performing structural stitching, additional stitching can be applied around the edge of a fabric preform, referred to as edge-stitching. The edge-stitching can provide resistance to shearing between layers of the fabric preform when subsequent stitches are applied. As such, the edge-stitching can help ensure that structural stitches that are subsequently applied to the fabric preform are applied at correct and consistent orientations, thereby improving mechanical performance of the resulting S/RI structure.

In some examples, edge-stitching can be strategically applied based on a shape or configuration of a fabric preform. For instance, edge-stitching can be applied within a scrap region of the fabric preform. A scrap region is a region that is designated to be removed (e.g., trimmed away) after curing the fabric preform. Further, optionally, edge-stitching can be applied with a stitch tension that is dependent upon a dry thickness of the fabric preform. For instance, edge-stitching can be applied using a stitch tension that is determined using any of the stitch tension determination methods disclosed herein.

Figure 5:
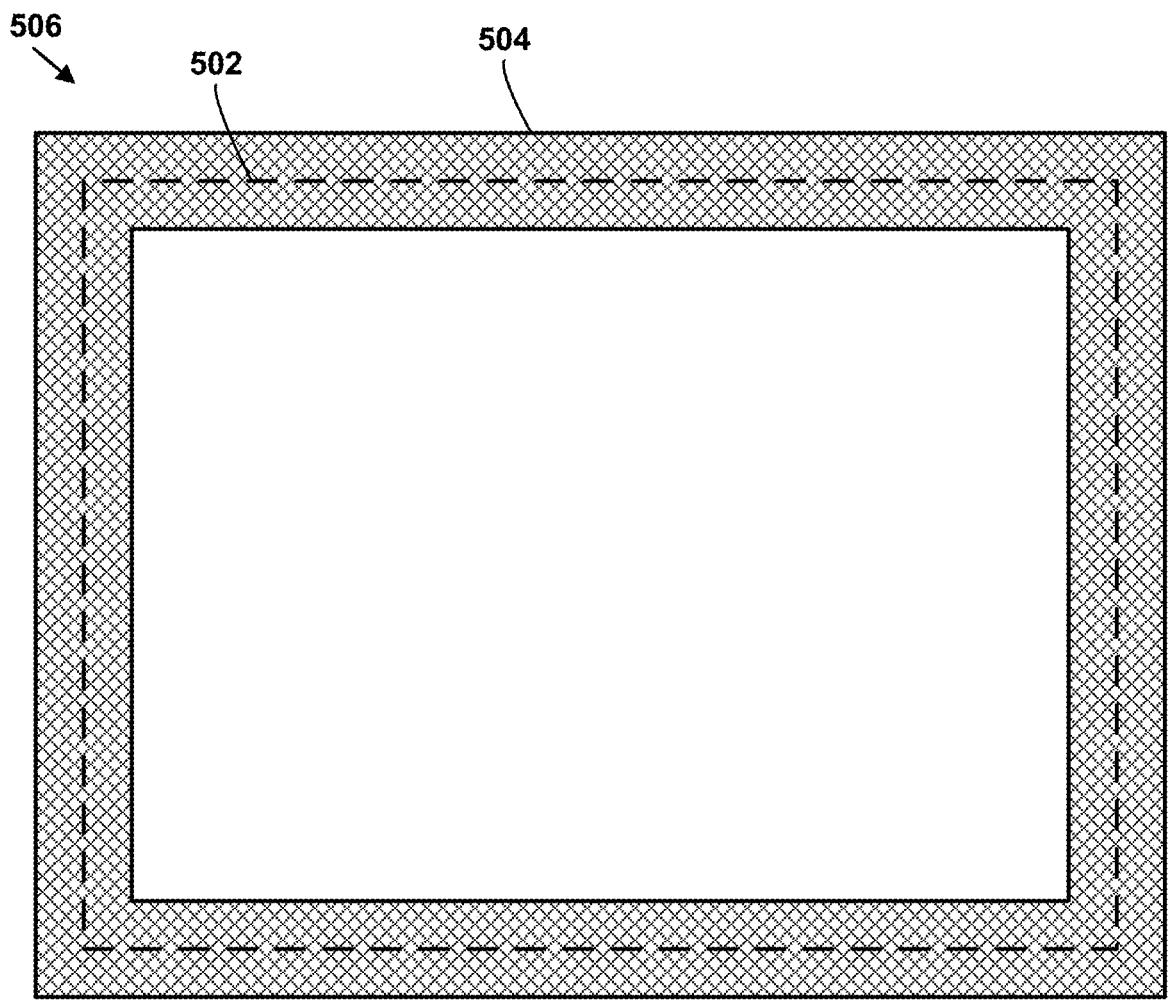
FIG. 5 is a conceptual illustration of edge-stitching, according to an example.

FIG. 5 is a conceptual illustration of edge-stitching, according to an example. More specifically, FIG. 5 is a top view of edge-stitching 502 that is applied within a scrap region 504 of a fabric preform 506. Scrap region 504 is located around a perimeter of fabric preform 506, and edge-stitching 502 is provided within the perimeter. As such, edge-stitching help prevent shearing of fabric preform when subsequent stitches are applied within the interior of fabric preform 506. Although fabric preform 506 is shown as a rectangular panel, the example is not meant to be limiting.

Figure 6:
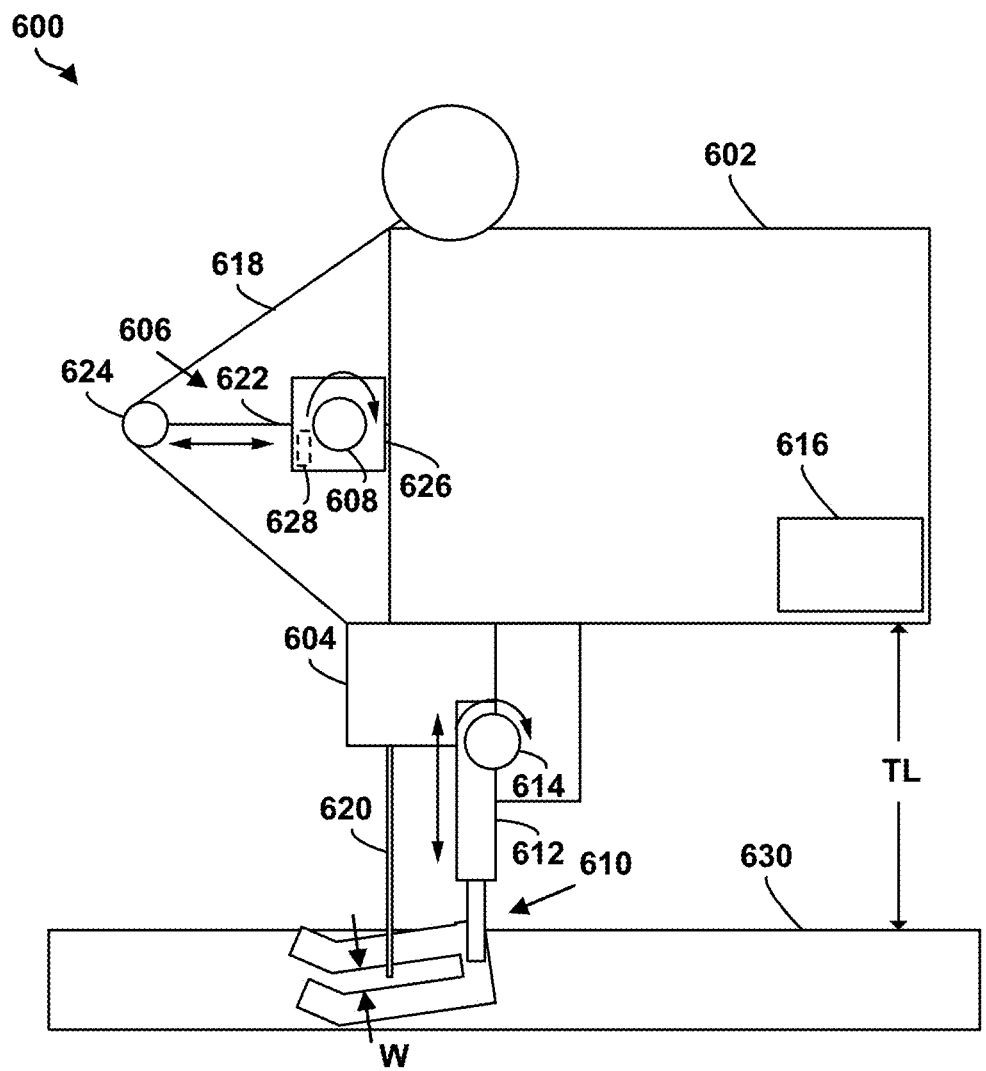
FIG. 6 is an example stitching machine.

FIG. 6 is an example stitching machine 600. As shown in FIG. 6, stitching machine 600 includes a stitching unit 602, a needle casing 604, an adjustable thread tensioner 606, a tension control knob 608, an adapter plate 610, a pressure adjuster 612, a pressure control knob 614, and a computing system 616.

Stitching unit 602 includes a user interface, one or more actuators, and a controller. The controller can be configured to cause the actuators to extend and retract needle casing 604 from stitching unit 602 in order to apply a stitch to a fabric preform using thread 618. The controller can include one or more processors coupled to a memory, and can be configured to control the actuators based on user input provided by an operator by way of the user interface.

Needle casing 604 is configured to hold a needle 620. Thread 618 can be attached to needle 620. Extending and retracting needle casing 604 can cause needle 620 to penetrate a fabric preform such that a stitch is applied to the fabric preform.

Adjustable thread tensioner 606 is configured to apply a predefined stitch tension to thread 618. Adjustable thread tensioner 606 includes a tension rod 622 extending from a side of stitching unit 602. Tension rod 622 is configured to apply the predefined stitch tension to thread 618. Tension rod 622, in turn, includes a thread support 624 configured to contact the thread. Thread support 624 can be a pulley, for instance. Adjustable thread tensioner 606 also includes a tension adjuster 626 configured to adjust the predefined stitch tension by adjusting a position of tension rod 622 relative to stitching unit 602. Tension adjuster 626 can include a rack and pinion that is operable using tension control knob 608 or an electric motor (not shown).

In operation, tension adjuster 626 can extend tension rod 622 to increase stitch tension. Conversely, tension adjuster 626 can retract tension rod 622 to decrease stitch tension. In some examples, the stitch tension can be predefined manually. For instance, an operator can define the stitch tension using tension control knob 608. Alternatively, the stitch tension can be predefined digitally. For instance, computing system 616 can cause tension adjuster 626 to adjust the stitch tension based on a dry thickness of a fabric preform. Computing system 616 can determine the stitch tension using any of the stitch tension determination methods disclosed herein.

Further, in some instances, adjustable thread tensioner 606 can utilize a load feedback loop to track the applied stitch tension and dynamically maintain the stitch tension within a threshold range of a target stitch tension. For example, adjustable thread tensioner 606 can include a feedback sensor 628 configured to output sensor data indicative of force applied to thread 618 by tension rod 622. For instance, feedback sensor 628 can be a piezoelectric sensor or force transducer coupled to tension rod 622, and can output sensor data to computing system 616. Computing system 616 can receive the sensor data provided by feedback sensor 628, and use the sensor data as feedback for controlling a position of tension rod 622. In some examples, computing system 616 can use the sensor data to ensure that force applied by tension rod 622 to thread 618 remains within a threshold force range. As the force applied by tension rod 622 decreases (e.g., due to changes in thickness of a fabric preform), computing system 616 can cause tension adjuster 626 to extend tension rod 622. Conversely, as the force applied by tension rod 622 increases, computing system 616 can cause tension adjuster 626 to retract tension rod 622.

Additionally or alternatively, computing system 616 can input the stitch tension as a function of thread length. This can provide the ability to maintain a constant "strain" in the applied stitch as material thickness changes across the fabric preform. By way of example, a thread length TL can be defined as a distance between stitching unit 602 and support surface 630. When applying a stitch under tension, thread 618 may deform (e.g., stretch) by an amount that is proportional to the thread length TL. As a thickness of a fabric preform changes or thicknesses of different fabric preforms vary, the distance between stitching unit 602 and support surface can be increased or decreased, such that the thread length TL also changes. As the thread length TL changes, the deformation in the thread also changes. To account for the deformation in thread 618, computing system 616 can determine the predefined stitch tension based on the thread length TL. For instance, computing system 616 can use a lookup table to convert a desired stitch tension and a thread length TL to a modified stitch tension that accounts for thread length TL.

Adapter plate 610 is configured to apply pressure to a fabric preform on two sides of a stitch location during stitching. Adapter plate can be coupled to needle casing 604 by way of a spring, such as a mechanical spring or a pneumatic spring that biases the adapter plate away from stitching unit 602 and towards a support surface 630 on which a fabric preform is positioned.

Pressure adjuster 612 can include a linear actuator (e.g., a rack and pinion) that is operable using pressure control knob 614 or an electric motor (not shown). In operation, pressure adjuster 612 can increase an amount by which adapter plate 610 extends from stitching unit 602 to increase the pressure. Conversely, pressure adjuster 612 can decrease the amount by which adapter plate 610 extends from stitching unit 602 to decrease the pressure.

In some examples, computing system 616 can cause pressure adjuster 612 to adjust the applied pressure. Computing system 616 can determine the pressure to apply in various manners. As one example, computing system 616 can determine the pressure to apply based on feedback detected by a pressure sensor of pressure adjuster 612. For instance, if adapter plate 610 encounters increased resistance when moving from a thin section of the fabric preform to a thick section of a fabric preform such that the pressure sensed by the pressure sensor increases, computing system 616 can cause the pressure adjuster 612 to decrease the applied pressure. Conversely, if the pressure sensed by the pressure sensor decreases when moving from a thick section of a fabric preform to a thin section of the fabric preform, computing system 616 can cause pressure adjuster 612 to increase the applied pressure. As another example, computing system 616 can determine the pressure to apply based on map of a fabric preform that indicates thicknesses or desired pressures for different respective sections of the fabric preform.

Adapter plate 610 includes a stitch opening through which needle 620 passes during stitching. Stitch opening has a width W. When needle 620 is pushed through a fabric preform having integrated fibers, it may be desirable to allow the fabric preform to deform slightly such that needle 620 does not damage the fibers. If the width W is too narrow, the fabric preform might not be able to deform enough to allow the stitch to be applied. On the other hand, if the width W is too large, adapter plate 610 might not provide enough resistance to shearing between layers of the fabric preform during stitching. Accordingly, in some examples, adapter plate 610 can include a linear actuator (e.g., a worm drive) that is configured to adjust a width W of a stitch opening of adapter plate 610. In this manner, the width W of the stitch opening of adapter plate 610 can be adjusted to help ensure that damage is not induced during stitching.

In other examples, the width of the stitch opening of adapter plate 610 might be fixed. However, adapter plate 610 could be interchangeable with other adapter plates having stitch openings with different widths.

Figure 7:
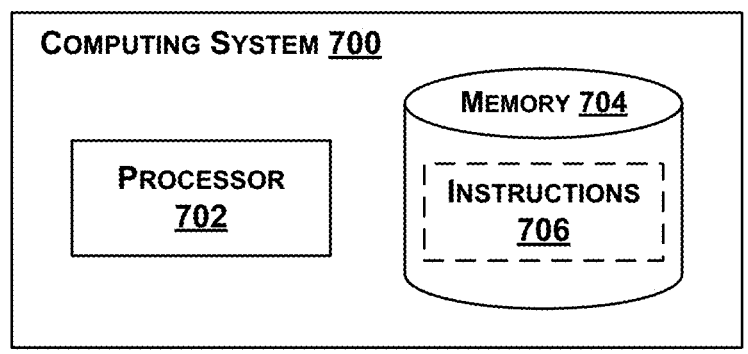
FIG. 7 is an example computing system.

FIG. 7 is an example computing system 700 for determining a stitch tension. Computing system 700 can take the form of a client device (e.g., a computing device that is actively operated by a user), a server, cloud computing device, or some other type of computational platform. In some examples, computing system 700 can take the form of a desktop computer, laptop computer, tablet computer, smartphone, wearable computing device (e.g., AR glasses), or other type of device.

Computing system 700 includes a processor 702 and a memory 704. Processor 702 can be a general-purpose processor or special purpose processor (e.g., a digital signal processor, application specific integrated circuit, etc.). Processor 702 is configured to execute instructions 706 (e.g., computer-readable program instructions including computer executable code) that are stored in the memory 704 and are executable to provide various operations described herein. In alternative examples, computing system 700 can include additional processors that are configured in the same manner. At least some of the operations described herein as being performed by computing system 700 can be performed by processor 702.

Memory 704 can take the form of one or more computer-readable storage media that can be read or accessed by processor 702. The computer-readable storage media can include volatile and/or non-volatile storage components, such as optical, magnetic, organic or other memory or disc storage, which can be integrated in whole or in part with processor 702. Memory 704 is considered non-transitory computer readable media. In some examples, memory 704 can be implemented using a single physical device (e.g., one optical, magnetic, organic or other memory or disc storage unit), while in other examples, memory 704 can be implemented using two or more physical devices.

Computing system 700 can be in communication with another device over a communication link. The communication link can take the form of any wired connection (e.g., Ethernet) or wireless connection (e.g., Bluetooth®) over which computing system 700 and the other device can engage in communication. For example, computing system 700 can engage in communication with a stitching machine. As such, computing system 700 can receive information from the stitching machine and/or transmit information to the stitching machine. For example, computing system 700 can transmit a control instruction to the stitching machine to cause the stitching machine to apply a stitch having a determined stitch tension.

In some examples, computing system 700 can be an integrated component of a stitching machine. For instance, computing system 700 can be part of stitching machine 600 of FIG. 6.

In operation, computing system 700 can perform any of the computing system functions described herein. For instance, computing system can determine a dry thickness of a fabric preform, determine a debulked thickness of the fabric preform, determine a stitch tension using the dry thickness of the fabric preform and the debulked thickness of the fabric preform, and cause a stitching machine to apply a stitch having the stitch tension to the fabric preform.

Figure 8:
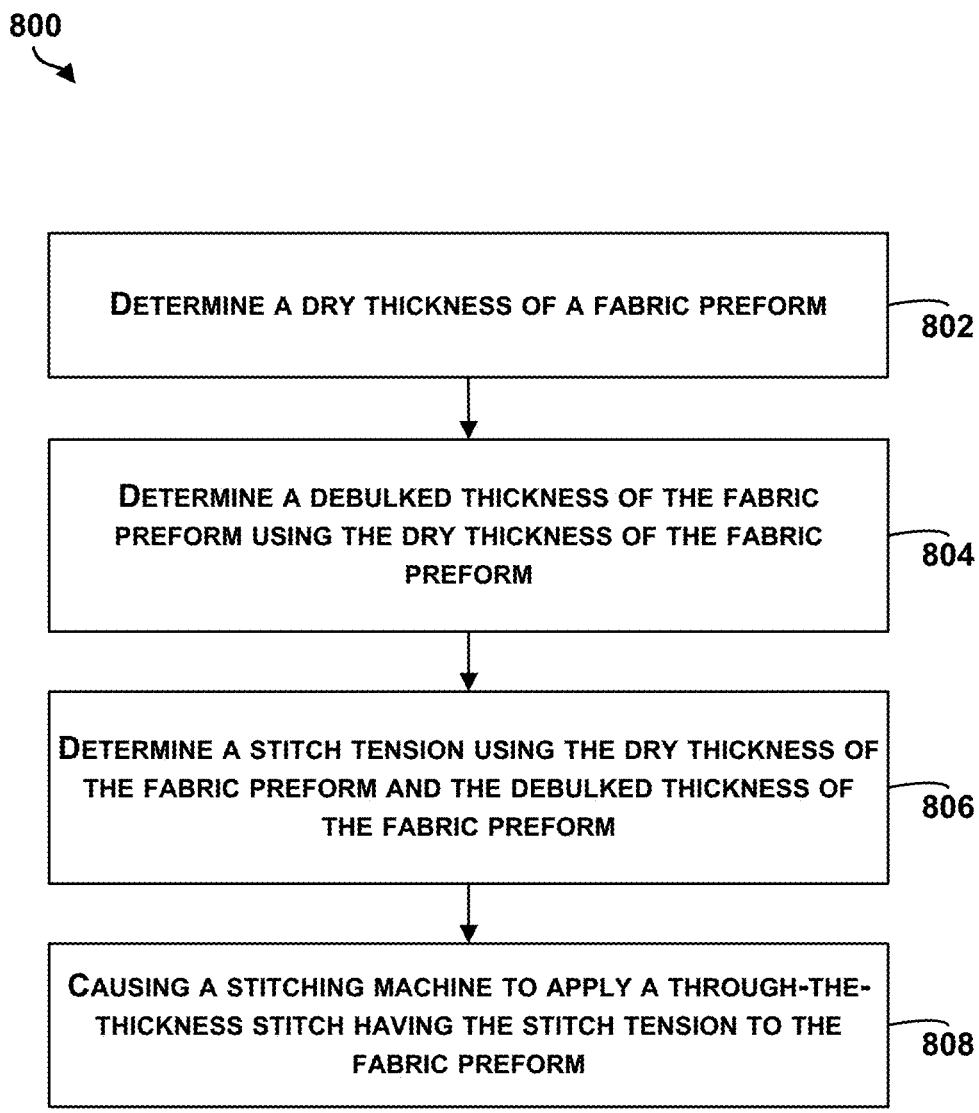
FIG. 8 shows a flowchart of a method, according to an example.

FIG. 8 shows a flowchart of a method 800, according to an example. Method 800 shown in FIG. 8 presents an embodiment of a method that, for example, could be used with any of the systems disclosed herein. Any of the computing systems described herein, such as computing system 700 of FIG. 7, may be used or configured to perform logical functions presented in FIG. 8.

Method 800 can include one or more operations, functions, or actions as illustrated by one or more of blocks 802-808. Although these blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer readable media that stores data for short periods of time like register memory, processor cache, and RAM. The computer readable media may also be any other volatile or non-volatile storage systems. The computer readable medium may be considered a tangible computer readable storage medium, for example.

Initially, at block 802, method 800 includes determining a dry thickness of a fabric preform. The fabric preform can be a fabric preform for a composite structure. A computing system can determine the dry thickness based on user input data provided by an operator, measurement data provided by a sensor, or thickness data stored in a map for the fabric preform.

At block 804, method 800 includes determining a debulked thickness of the fabric preform using the dry thickness of the fabric preform. The debulked thickness can be an expected thickness of the fabric preform after debulking the fabric preform.

At block 806, method 800 includes determining a stitch tension using the dry thickness of the fabric preform and the debulked thickness of the fabric preform. Determining the stitch tension can involve determining a stitch tension that causes a thickness of a stitch region of the stitch after debulking the fabric preform to be substantially equal to the debulked thickness of the fabric preform with the stitch being substantially linear through the thickness of the stitch region.

And at block 808, method 800 includes causing a stitching machine to apply a through-the-thickness stitch having the stitch tension to the fabric preform. For example, a computing system can transmit the stitch tension to the stitching machine, or a computing system can display the stitch tension on a display, and an operator can set the stitch tension of the stitching machine accordingly.

Figure 9:
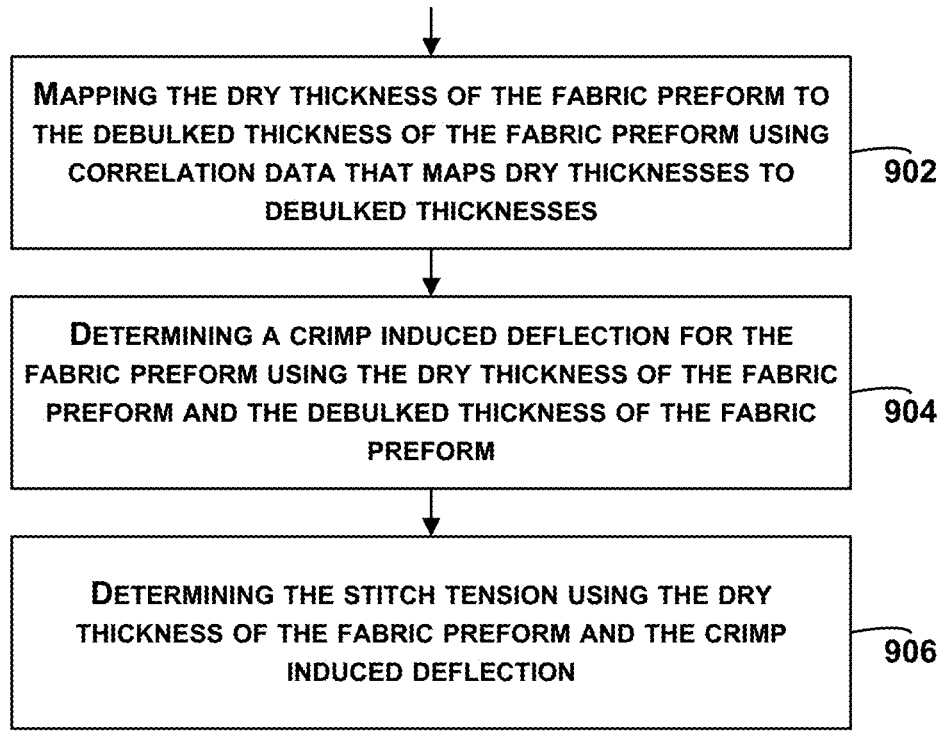
FIG. 9 shows additional operations for use with the method shown in FIG. 8.

FIG. 9 shows additional operations for use with the method shown in FIG. 6. Block 902 could be performed as part of block 804 of FIG. 8. Blocks 904 and 906 could be performed as part of block 806 of FIG. 8. At block 902, FIG. 9 includes mapping the dry thickness of the fabric preform to the debulked thickness of the fabric preform using correlation data that maps dry thicknesses to debulked thicknesses. The correlation data could be stored within a lookup table, for instance. At block 904, FIG. 9 includes determining a crimp induced deflection for the fabric preform using the dry thickness of the fabric preform and the debulked thickness of the fabric preform. For example, a computing system can determine the crimp induced deflection by dividing the debulked thickness by the dry thickness. At block 906, FIG. 9 includes determining the stitch tension using the dry thickness of the fabric preform and the crimp induced deflection.

Figure 10:
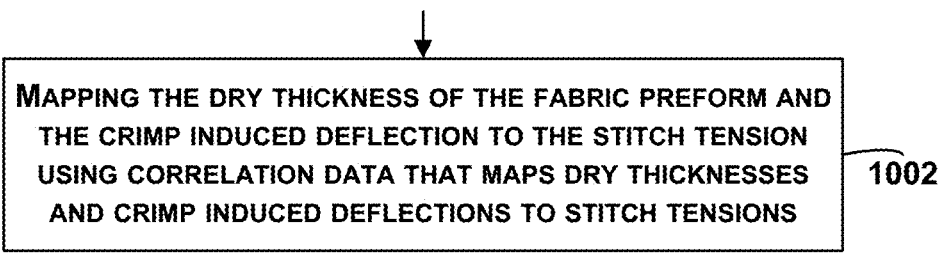
FIG. 10 shows an additional operation for use with the method shown in FIG. 8.

FIG. 10 shows an additional operation for use with the method shown in FIG. 8. Block 1002 could be performed as part of block 906 of FIG. 9. At block 1002, FIG. 8 includes mapping the dry thickness of the fabric preform and the crimp induced deflection to the stitch tension using correlation data that maps dry thicknesses and crimp induced deflections to stitch tensions. The correlation data could be stored within a lookup table, for instance.

Figure 11:
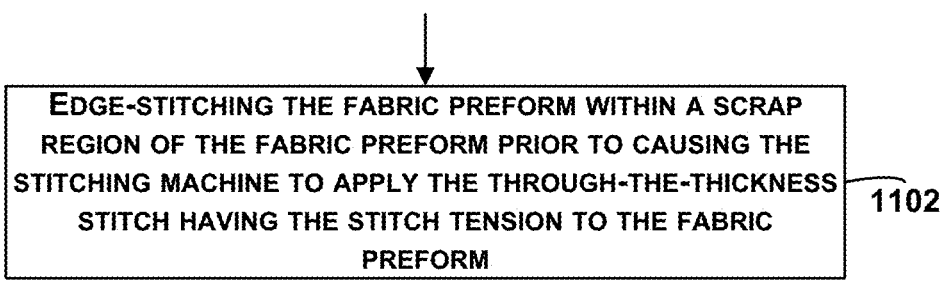
FIG. 11 shows an additional operation for use with the method shown in FIG. 8.

FIG. 11 shows an additional operation for use with the method shown in FIG. 8. Block 1102 could be performed prior to block 808 of FIG. 8. At block 1102, FIG. 11 includes edge-stitching the fabric preform within a scrap region of the fabric preform prior to causing the stitching machine to apply the through-the-thickness stitch having the stitch tension to the fabric preform. Edge-stitching the fabric preform can help reduce shearing during subsequent stitching of the fabric preform.

Figure 12:
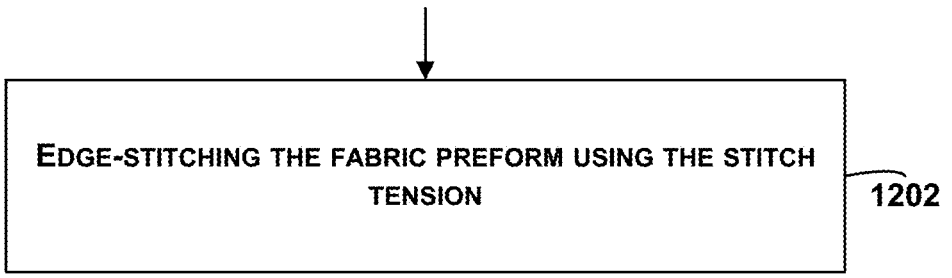
FIG. 12 shows an additional operation for use with the method shown in FIG. 8.

FIG. 12 shows an additional operation for use with the method shown in FIG. 8. Block 1202 could be performed as part of block 1102 of FIG. 11. At block 1202, FIG. 12 includes edge-stitching the fabric preform using the stitch tension.

Figure 13:
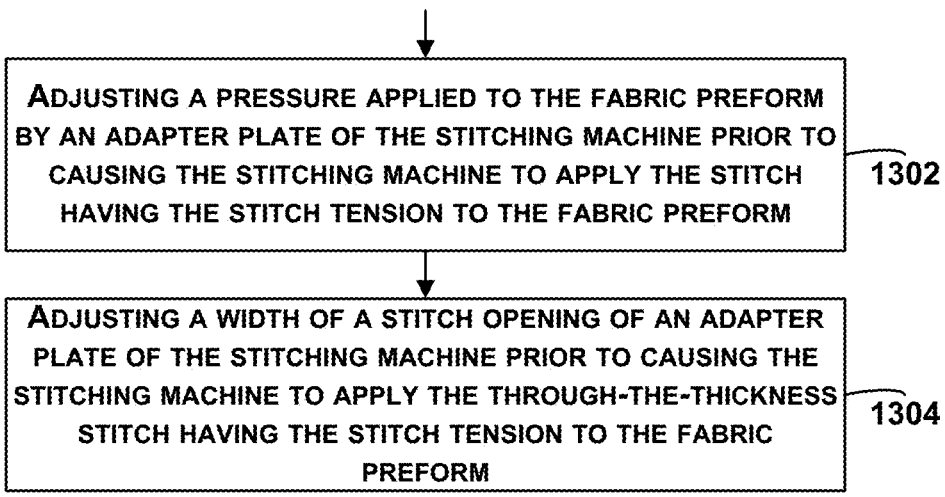
FIG. 13 shows additional operations for use with the method shown in FIG. 8.

FIG. 13 shows additional operations for use with the method shown in FIG. 8. Blocks 1302 and 1304 could be performed prior to block 808 of FIG. 8. At block 1302, FIG. 13 includes adjusting a pressure applied to the fabric preform by an adapter plate of the stitching machine prior to causing the stitching machine to apply the through-the-thickness stitch having the stitch tension to the fabric preform. A computing system can cause a pressure adjuster to adjust the applied pressure. Alternatively, an operator can use a pressure control knob to adjust the applied pressure. The adapter plate can help prevent shearing of the fabric preform during stitching by applying pressure to the fabric preform on two sides of a stitch location during stitching.

At block 1304, FIG. 13 includes adjusting a width of a stitch opening of an adapter plate of the stitching machine prior to causing the stitching machine to apply the through-the-thickness stitch having the stitch tension to the fabric preform. A computing system can cause a linear actuator to adjust the size of the stitch opening. Alternatively, an operator can adjust the size of the stitch opening. Adjusting the size of the stitch opening can help ensure that damage is not induced during the stitching process.

Figure 14:
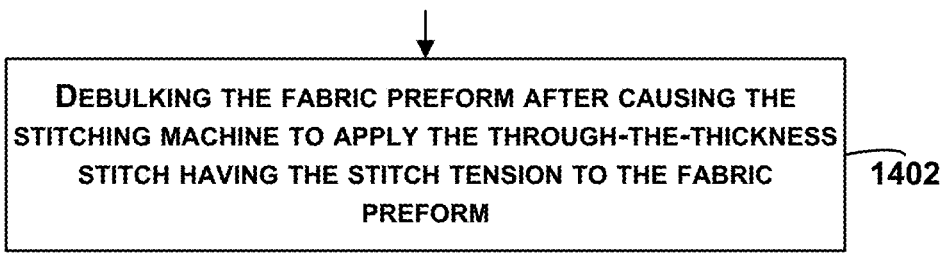
FIG. 14 shows an additional operation for use with the method shown in FIG. 8.

FIG. 14 shows an additional operation for use with the method shown in FIG. 8. Block 1402 could be performed after block 808 of FIG. 8. At block 1402, FIG. 14 includes debulking the fabric preform after causing the stitching machine to apply the through-the-thickness stitch having the stitch tension to the fabric preform. Debulking the fabric preform can involve applying vacuum pressure to a fabric preform in order to reduce a thickness of the fabric preform.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A method comprising:
   determining, by a computing system, a dry thickness of a fabric preform;
   determining, by the computing system, a debulked thickness of the fabric preform using the dry thickness of the fabric preform;
   determining, by the computing system, a stitch tension using the dry thickness of the fabric preform and the debulked thickness of the fabric preform; and
   causing, by the computing system, a stitching machine to apply a through-the-thickness stitch having the stitch tension to the fabric preform.

2. The method of claim 1, wherein:
   the fabric preform is a fabric preform for a composite structure, and
   the debulked thickness of the fabric preform is an expected thickness of the fabric preform after debulking the fabric preform.

3. The method of claim 1, wherein determining the debulked thickness of the fabric preform using the dry thickness of the fabric preform comprises mapping the dry thickness of the fabric preform to the debulked thickness of the fabric preform using correlation data that maps dry thicknesses to debulked thicknesses.

4. The method of claim 1, wherein determining the stitch tension using the dry thickness of the fabric preform and the debulked thickness of the fabric preform comprises:
   determining a crimp induced deflection for the fabric preform using the dry thickness of the fabric preform and the debulked thickness of the fabric preform; and
   determining the stitch tension using the dry thickness of the fabric preform and the crimp induced deflection.

5. The method of claim 4, wherein:
   determining the stitch tension using the dry thickness of the fabric preform and the crimp induced deflection comprises mapping the dry thickness of the fabric preform and the crimp induced deflection to the stitch tension using correlation data that maps dry thicknesses and crimp induced deflections to stitch tensions.

6. The method of claim 1, further comprising edge-stitching the fabric preform within a scrap region of the fabric preform prior to causing the stitching machine to apply the through-the-thickness stitch having the stitch tension to the fabric preform.

7. The method of claim 6, wherein edge-stitching the fabric preform comprises edge-stitching the fabric preform using the stitch tension.

8. The method of claim 1, further comprising adjusting a pressure applied to the fabric preform by an adapter plate of the stitching machine prior to causing the stitching machine to apply the through-the-thickness stitch having the stitch tension to the fabric preform.

9. The method of claim 1, further comprising adjusting a width of a stitch opening of an adapter plate of the stitching machine prior to causing the stitching machine to apply the through-the-thickness stitch having the stitch tension to the fabric preform.

10. The method of claim 1, further comprising debulking the fabric preform after causing the stitching machine to apply the through-the-thickness stitch having the stitch tension to the fabric preform,
wherein a thickness of a stitch region of the through-the-thickness stitch after debulking the fabric preform is substantially equal to the debulked thickness of the fabric preform, and
wherein the through-the-thickness stitch is substantially linear through the thickness of the stitch region.

11. A stitching machine comprising:
a stitching unit;
an adjustable thread tensioner configured to apply a predefined stitch tension to a thread,
wherein the adjustable thread tensioner comprises:
a tension rod extending from a side of the stitching unit and configured to apply the predefined stitch tension to the thread, the tension rod comprising a thread support configured to contact the thread; and
a tension adjuster configured to adjust a position of the tension rod relative to the stitching unit; and
a computing system configured to cause the tension adjuster to adjust the predefined stitch tension based on a dry thickness of a fabric preform, wherein the computing system is configured to:
determine a debulked thickness of the fabric preform using the dry thickness of the fabric preform; and
determine the predefined stitch tension using the dry thickness of the fabric preform and the debulked thickness of the fabric preform.

12. The stitching machine of claim 11, further comprising:
an adapter plate configured to apply pressure to a fabric preform on two sides of a stitch location during stitching; and
a pressure adjuster configured to adjust the pressure.

13. The stitching machine of claim 12, wherein the computing system is configured to cause the pressure adjuster to adjust the pressure.

14. The stitching machine of claim 12, further comprising a pressure control knob configured to control the pressure adjuster.

15. The stitching machine of claim 11, wherein:
the fabric preform is a fabric preform for a composite structure, and
the debulked thickness of the fabric preform is an expected thickness of the fabric preform after debulking the fabric preform.

16. The stitching machine of claim 11, wherein determining the debulked thickness of the fabric preform using the dry thickness of the fabric preform comprises mapping the dry thickness of the fabric preform to the debulked thickness of the fabric preform using correlation data that maps dry thicknesses to debulked thicknesses.

17. A computing system comprising:
a processor; and
a non-transitory computer-readable medium having stored therein instructions that are executable to cause the computing system to perform functions comprising:
determining a dry thickness of a fabric preform,
determining a debulked thickness of the fabric preform using the dry thickness of the fabric preform,
determining a stitch tension using the dry thickness of the fabric preform and the debulked thickness of the fabric preform, and
causing a stitching machine to apply a through-the-thickness stitch having the stitch tension to the fabric preform.

18. The computing system of claim 17, wherein:
the fabric preform is a fabric preform for a composite structure, and
the debulked thickness of the fabric preform is an expected thickness of the fabric preform after debulking the fabric preform.

19. The computing system of claim 17, wherein determining the debulked thickness of the fabric preform using the dry thickness of the fabric preform comprises mapping the dry thickness of the fabric preform to the debulked thickness of the fabric preform using correlation data that maps dry thicknesses to debulked thicknesses.

20. The computing system of claim 17, wherein determining the stitch tension using the dry thickness of the fabric preform and the debulked thickness of the fabric preform comprises:
determining a crimp induced deflection for the fabric preform using the dry thickness of the fabric preform and the debulked thickness of the fabric preform; and
determining the stitch tension using the dry thickness of the fabric preform and the crimp induced deflection.

* * * * *